(12) United States Patent
Burtea et al.

(10) Patent No.: US 7,800,023 B2
(45) Date of Patent: Sep. 21, 2010

(54) CONVEYOR OVEN WITH HYBRID HEATING SOURCES

(75) Inventors: Constantin Burtea, Lindenhurst, IL (US); Sanda Burtea, legal representative, Lindenhurst, IL (US); Frank Anthony Agnello, South Elgin, IL (US); Don Van Erden, Wildwood, IL (US)

(73) Assignee: Prince Castle LLC, Carol Stream, IL (US)

( * ) Notice: Subject to any disclaimer, the term of this patent is extended or adjusted under 35 U.S.C. 154(b) by 261 days.

(21) Appl. No.: 11/739,177

(22) Filed: Apr. 24, 2007

(65) Prior Publication Data
US 2008/0264406 A1    Oct. 30, 2008

(51) Int. Cl.
| A21B 1/06 | (2006.01) |
| A21B 1/48 | (2006.01) |
| F27B 9/06 | (2006.01) |
| F27B 9/36 | (2006.01) |
| F27B 9/40 | (2006.01) |
| F24C 3/04 | (2006.01) |
| F23N 5/00 | (2006.01) |

(52) U.S. Cl. .................. 219/411; 219/388; 99/331; 99/386; 99/443 C; 126/92 AC; 431/329

(58) Field of Classification Search ............ 431/329
See application file for complete search history.

(56) References Cited

U.S. PATENT DOCUMENTS

| 392,162 A | 10/1888 | McDowell et al. |
| 3,008,513 A | 11/1961 | Holden |
| 3,084,736 A | 4/1963 | Mentel et al. |
| 3,129,749 A | 4/1964 | Honger |
| 3,199,573 A * | 8/1965 | Fiynn ............. 431/329 |
| 3,852,025 A * | 12/1974 | Placek ............. 431/329 |
| 4,286,509 A | 9/1981 | Miller et al. |
| 4,421,015 A * | 12/1983 | Masters et al. ....... 99/332 |
| 4,501,072 A * | 2/1985 | Jacobi et al. ........ 34/267 |
| 4,530,276 A | 7/1985 | Miller |
| 4,557,203 A * | 12/1985 | Mainord ........... 110/344 |
| 4,739,154 A | 4/1988 | Bharara et al. |
| 4,927,355 A * | 5/1990 | Haire et al. ........ 431/329 |
| 4,936,286 A * | 6/1990 | Baker ............. 126/41 R |
| 4,951,648 A * | 8/1990 | Shukla et al. ....... 126/21 A |
| 5,154,160 A * | 10/1992 | Burtea et al. ....... 126/21 A |
| 5,174,744 A | 12/1992 | Singh |
| 5,240,411 A | 8/1993 | Abalos |

(Continued)

FOREIGN PATENT DOCUMENTS

DE    195 11 683 A1    11/1995

OTHER PUBLICATIONS

Office action mailed Jan. 22, 2009, in U.S. Appl. No. 11/692,465.

(Continued)

*Primary Examiner*—Joseph M Pelham
(74) *Attorney, Agent, or Firm*—Kelly & Krause, L.P.; Joseph P. Krause

(57) ABSTRACT

A conveyor oven is provided with both electric and gas-fired infrared heaters. The heat output from the gas fired infrared heater is controlled by cycling or pulsing the gas supply to one or more burners that emit infrared heat by heating a nichrome screen wire.

13 Claims, 8 Drawing Sheets

U.S. PATENT DOCUMENTS

| | | | |
|---|---|---|---|
| 5,296,683 A | | 3/1994 | Burkett et al. |
| 5,520,536 A | * | 5/1996 | Rodgers et al. ............. 431/329 |
| 5,571,009 A | | 11/1996 | Stalhane et al. |
| 5,676,870 A | | 10/1997 | Wassman et al. |
| 5,883,362 A | * | 3/1999 | Pettibone et al. ............ 219/411 |
| 5,960,704 A | | 10/1999 | March et al. |
| 5,989,013 A | | 11/1999 | Gray |
| 5,990,454 A | | 11/1999 | Westerberg et al. |
| 6,069,345 A | | 5/2000 | Westerberg |
| 6,192,789 B1 | | 2/2001 | Agcaoili et al. |
| 6,330,791 B1 | | 12/2001 | Kendall et al. |
| 6,369,360 B1 | | 4/2002 | Cook |
| 6,659,765 B1 | | 12/2003 | Sen-Yu |
| 6,684,875 B1 | * | 2/2004 | Schjerven et al. ......... 126/21 A |
| 6,707,014 B1 | | 3/2004 | Corey et al. |
| 6,867,399 B2 | | 3/2005 | Muegge et al. |
| 6,872,926 B1 | | 3/2005 | Arntz et al. |
| 6,896,512 B2 | | 5/2005 | Rattner et al. |
| 7,038,172 B1 | * | 5/2006 | Stuck ........................ 219/388 |
| 7,297,903 B1 | | 11/2007 | March et al. |
| 2002/0132205 A1 | | 9/2002 | Gore et al. |
| 2002/0146658 A1 | * | 10/2002 | Ibrahim et al. ................ 432/20 |
| 2004/0170936 A1 | | 9/2004 | Weclas et al. |
| 2005/0173400 A1 | | 8/2005 | Cavada et al. |
| 2006/0003279 A1 | | 1/2006 | Best |
| 2007/0084457 A1 | | 4/2007 | Wiedemann |

OTHER PUBLICATIONS

Final Office Action dated Oct. 16, 2009 U.S. Appl. No. 11/692,424, filed Mar. 28, 2007.

Non-final Office Action dated Jun. 22, 2009 U.S. Appl. No. 11/749,284, filed May 16, 2007.

Fundamentals of Heat and Mass Transfer, 6th Edition, by Frank P. Incropera, David P. DeWitt, Theodore L. Bergman, and Adriennes S. Lavine, copyright 2007, by John Wiley & Sons, Inc.; pp. 723-752.

Non-final Office Action dated Jun. 28, 2010, U.S. Appl. No. 11/749,284, filed May 16, 2007.

* cited by examiner

CONVEYOR OVEN WITH HYBRID HEATING SOURCES

BACKGROUND

This invention relates to conveyor ovens used to cook food. More particularly, this invention relates to conveyor ovens that cook foods using infrared energy.

Heat transfer occurs in at least one of three ways: conduction; convection and radiation. Conduction requires direct physical contact between two objects, such as when pan-flying foods. Convection relies on heat transfer via a liquid or gas. In a conventional, i.e., convection oven, heated air molecules bump into other molecules, and transfer some of their energy. Radiant heat, i.e., infrared heat, is different. It heats by the transfer of electromagnetic energy; it does not rely on any intermediary to conduct heat because it works directly on molecules in its path.

FIG. 1 depicts the relationship between IR radiation emitted from a surface as a function of wavelength at various surface temperatures. Surfaces temperatures above about 2000 degrees C. will emit relatively short wavelength IR that is in the visible spectrum. Short wavelength IR is also known to penetrate materials more deeply than long wavelength IR. At surface temperatures below 900 degrees C., the emitted IR is of a much longer wavelength, less "intense" and less penetrating.

Since all heat transfer involves some loss, radiant cooking is more energy efficient because less energy is lost heating a conductor, whether the heat conductor is a solid material or the air enclosed in a conventional oven. Cooking with infrared heat is therefore faster and more energy efficient than either conduction or convention.

Conveyor ovens that cook using infrared heat that is provided by electric resistance are slow to heat, slow to cool and slow to adjust their heat output levels, but their control is relatively straightforward. In general, gas-fired appliances, including ovens, heat quickly and cool quickly, however, infrared heat is difficult to controllably generate from gas combustion and it's output wavelength and intensity is difficult to adjust, in part because adjusting the volumetric flow rate of a fuel gas through a gas valve is difficult to do. A conveyor oven that can tale advantage of infrared energy supplied by both gas and electric energy sources would be an improvement over the prior art.

SUMMARY

A hybrid oven heats foods using infrared heat provided from both electrically powered infrared heaters and gas-fired infrared heaters. The gas-fired heater uses wire mesh burner plates comprised of substantially parallel, spaced-apart wire mesh burner plates, the spacing of which provides a fuel/air mixture space above, which is a screen that is heated by the combustion of a fuel gas. Fuel gas combustion heats a burner plate screen to a temperature at which it emits infrared energy. Infrared heat control is accomplished by cycling the fuel gas on and off according to a desired result in a food item being cooked. Infrared heat from electric heaters is accomplished by cycling the power on and off, varying the supply voltage to the heaters or controlling the duty cycle of an A.C. voltage used to heat the electric heaters. The gas supply on/off time and electric current on/off time is determined empirically.

DETAILED DESCRIPTION

Figure 1:
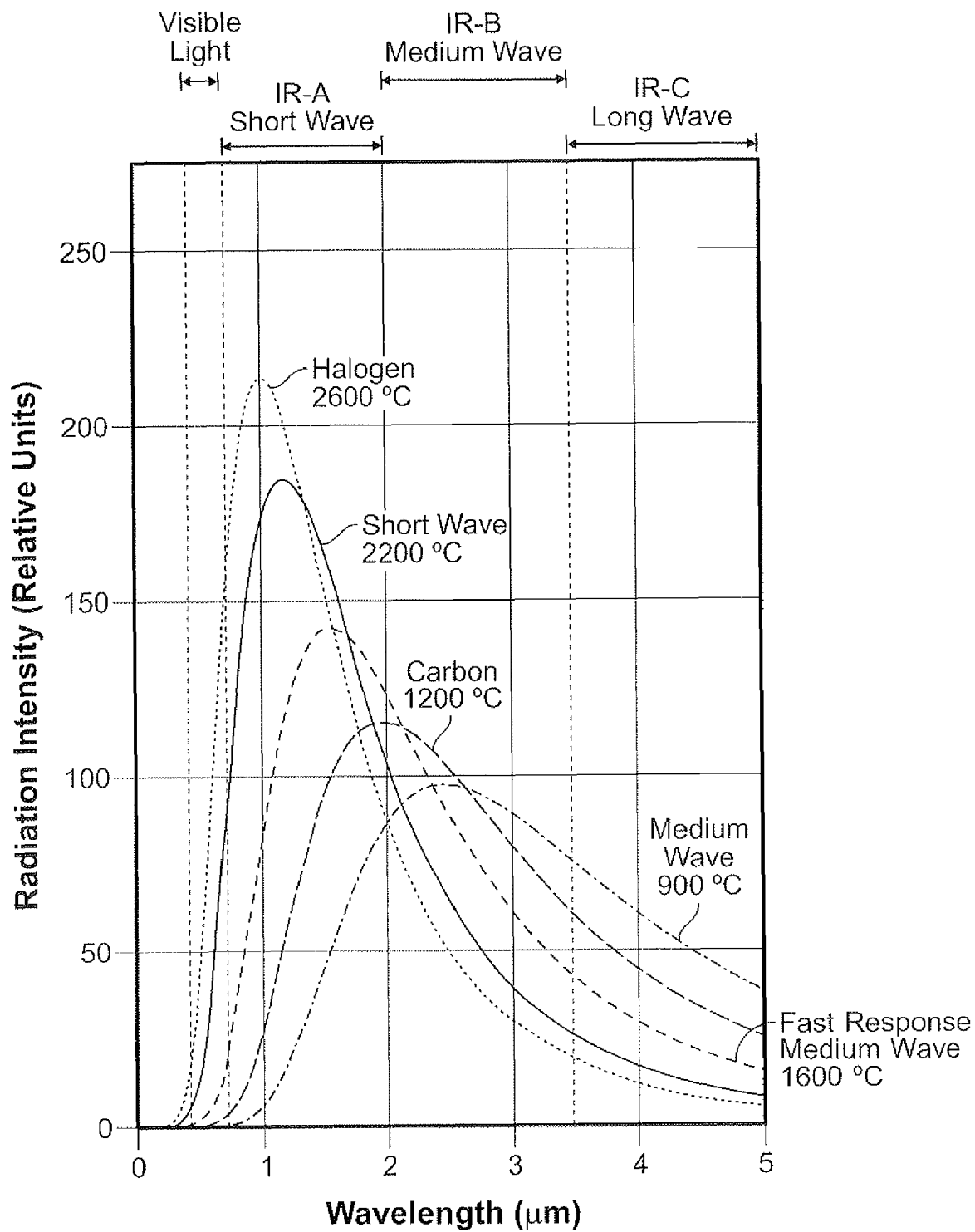
FIG. 1 is a graph of infrared energy emission as a function of IR wavelength, for a body at various temperatures
Figure 2:
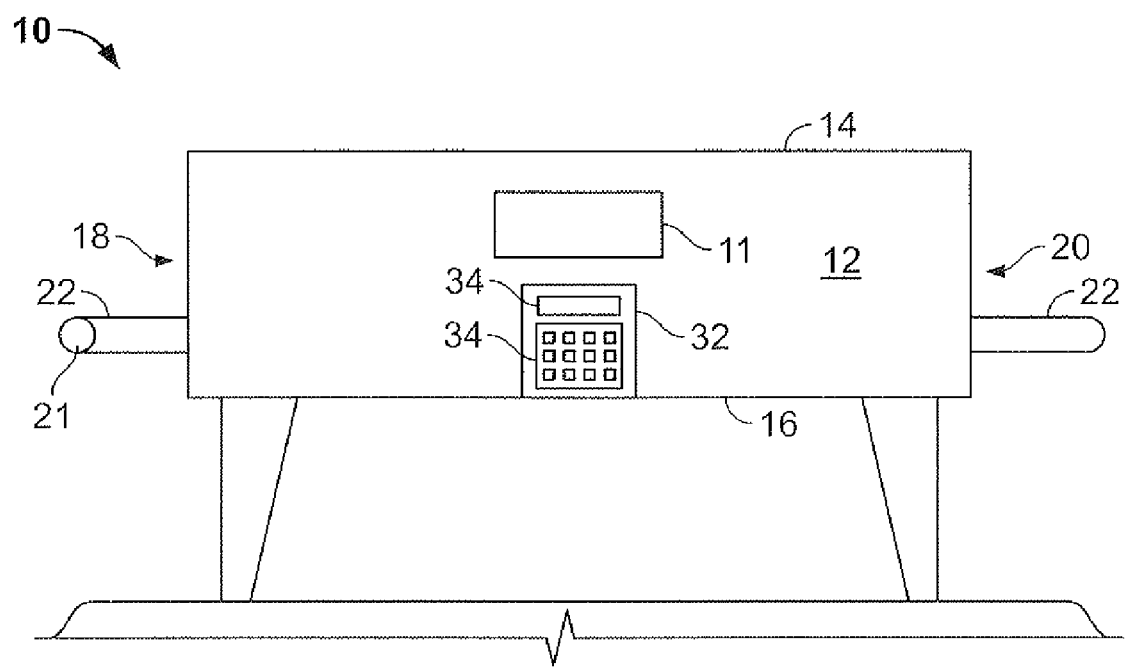
FIG. 2 is a front view of a hybrid oven.

FIG. 2 is a front view of a conveyor oven 10 with both electric and gas infrared heating sources. The oven 10 is referred to herein as a hybrid oven because it uses two different energy sources.

The hybrid oven 10 is defined by housing within which is a cavity 12. The housing, as well as the cavity 12, has a top 14, a bottom 16 a first opening 18 on the left-hand side and a second opening 20 on the right-hand side.

The cavity 12 encloses heaters that direct infrared heat toward a conveyor 22 that carries foods from the first opening 18 to the second opening 20. Because the heaters are hot and because the cavity 12 entraps air within it, the heaters within the cavity 12 also generate convective heat as well.

FIG. 2 also depicts a controller 32 having a keypad and display unit 34. The keypad and display unit 34 allow an operator to enter commands to the controller, which effectuates cooking control. Cooking control is achieved by adjusting the speed of the motor 21 driving the conveyor 22. Cooking control is also achieved by controlling the heat provided by electrically powered infrared heaters within the cavity and by controlling the infrared heat from gas-fired infrared heaters within the cavity 12. Note that neither the gas nor the electric heaters are shown in FIG. 2.

In one embodiment, the conveyor 22 is driven by a variable speed motor 21, the speed of which is determined by the controller 32. The oven 10 is also provided with one or more viewing windows 11 made from a translucent, heat-tolerant and IR-suppressing glass in order to allow an operator to continuously and safely monitor the cooking process within the oven 10.

Figure 3:
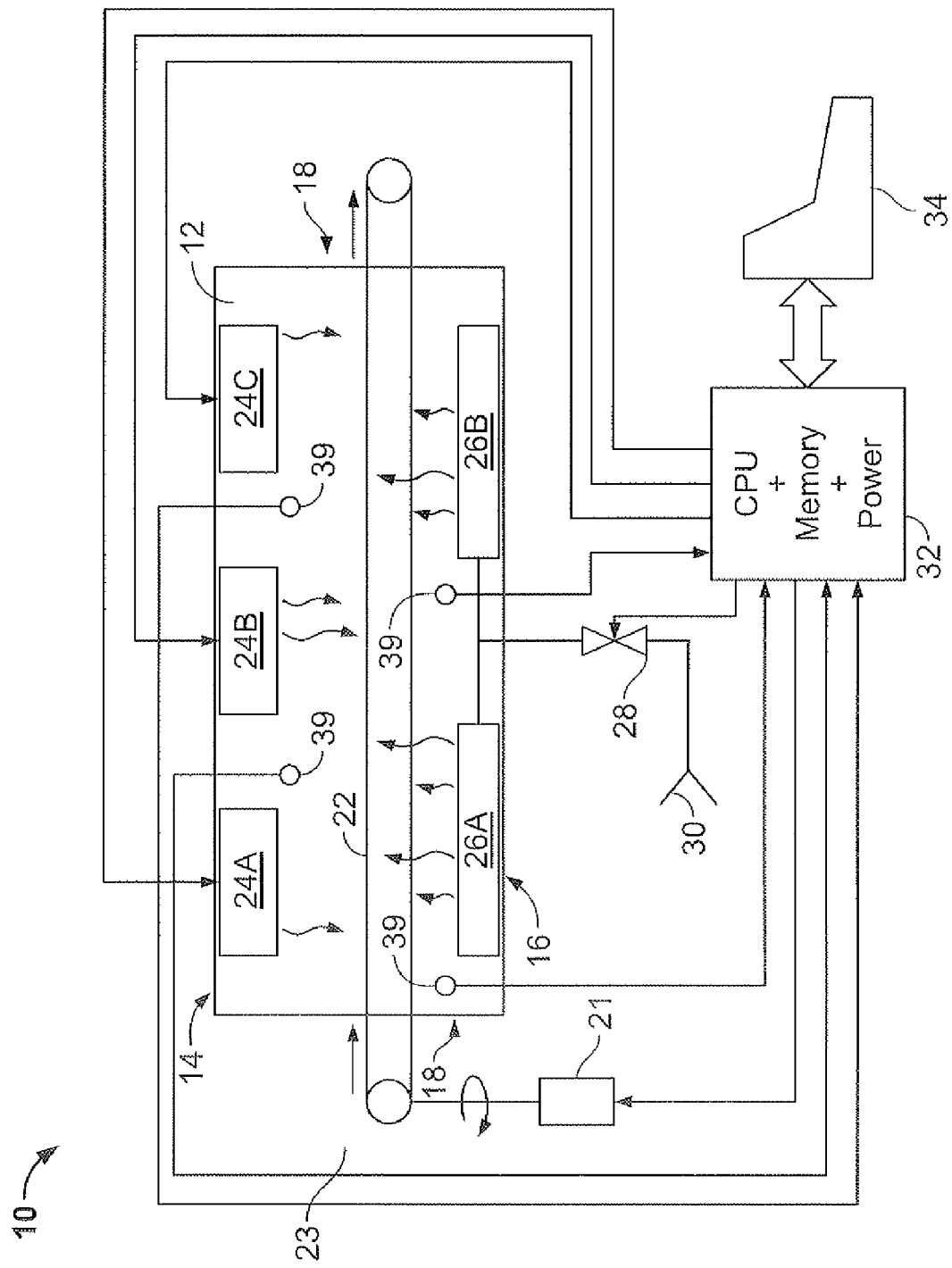
FIG. 3 is a schematic view of a hybrid oven.

FIG. 3 shows a schematic diagram of the oven 10 depicted in FIG. 2. The heating sources 24 and 26 face the conveyor 22 as well as each other. When a food item enters the cavity 12 on the conveyor 22 through the first opening 16, the food is subjected to infrared heat from both the top 14 and the bottom 16 of the cavity 12. The three top-mounted heaters 24A, 24B and 24C are electrically powered infrared heaters. Alternate embodiments of the oven 10 employ less than three and more than three top-mounted heaters 24, each of which can be controlled to emit various different wavelength IR, based on how much heat might be needed to heat or cook a food item on the conveyor 22, as well as how much output heat is required from each heater.

Two gas-fired, infrared-generating heaters 26A and 26B are shown, both of which are located immediately below the conveyor 22 and facing upwardly from the oven bottom 16. Heaters 26A and 26B generate infrared heat from the combustion of a fuel gas (natural or liquid propane) and direct the generated infrared heat upwardly toward the conveyor 22. The gas-fired heaters 26 necessarily generate convective heat, however, most of the effective heat they produce is infrared.

Infrared energy from the first electrically powered burner 24A heats food from above the food item, whereas the gas-fired burner 26A emits infrared energy to heat the food from below the food item. Thus, IR is provided to both the top and the bottom surfaces of food items on the conveyor 22.

As the conveyor 22 moves from left to right, the conveyor 22 carries the food item under a second electrically powered infrared heater 24B. A second infrared-emitting gas-fired burner 26B located below the conveyor 22 also directs additional infrared heat upwardly toward the conveyor 22. As with the first electric heated 24A and the first gas-fired heater 26A, both of the second heaters, 24B and 26B emit infrared heat. The upper heater 24B emits IR generated from electric resistive heating whereas the lower heater 26B emits IR generated by combustion.

A third electrically powered infrared heater 24C at the top 14 of the cavity 12 also provides downwardly directed infrared heat near the second opening 18 of the oven 10. Third, fourth, fifth or more gas-fired burners could also be provided based on cooking requirements that include, the type of food being heated or cooked, its initial temperature, its desired output temperature and conveyor speed or the through-put required of the oven.

Figure 7:
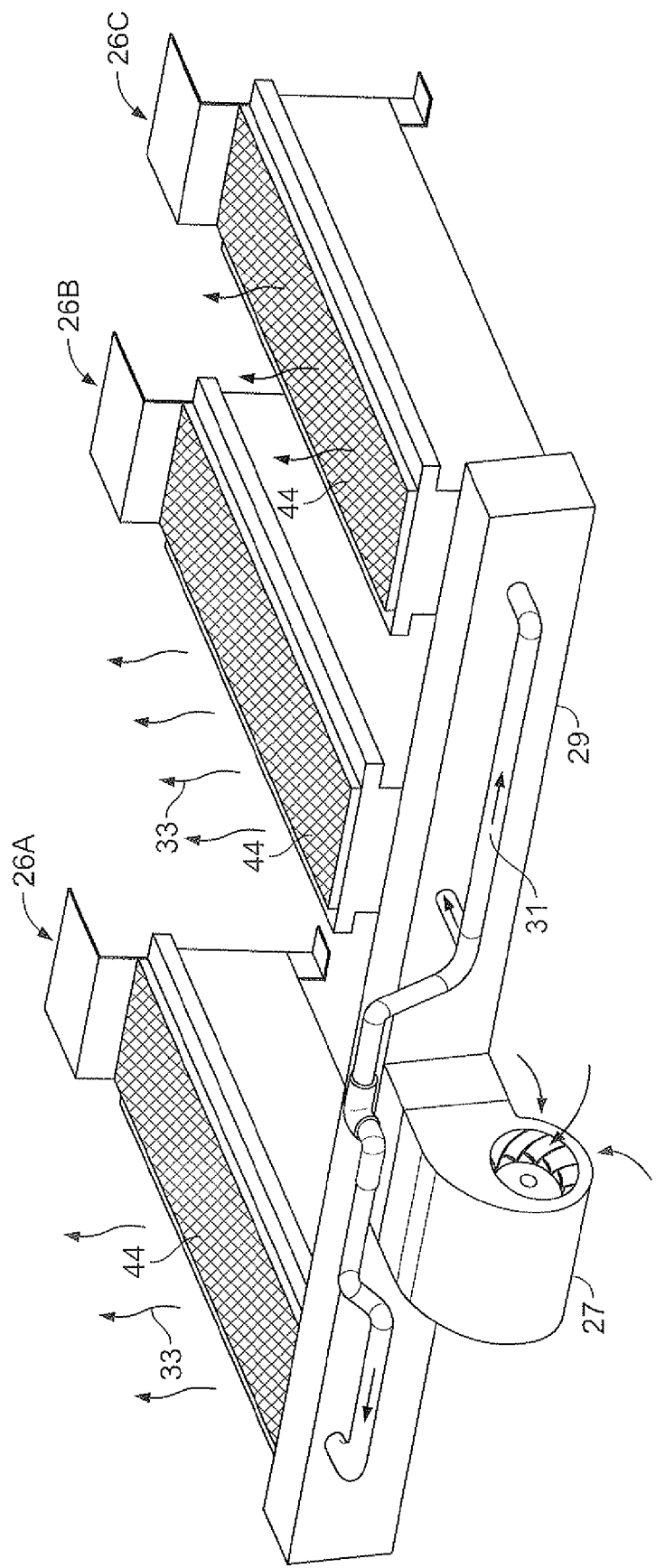
FIG. 7 shows three infrared-emitting gas burners operated side-by-side.
Figure 8:
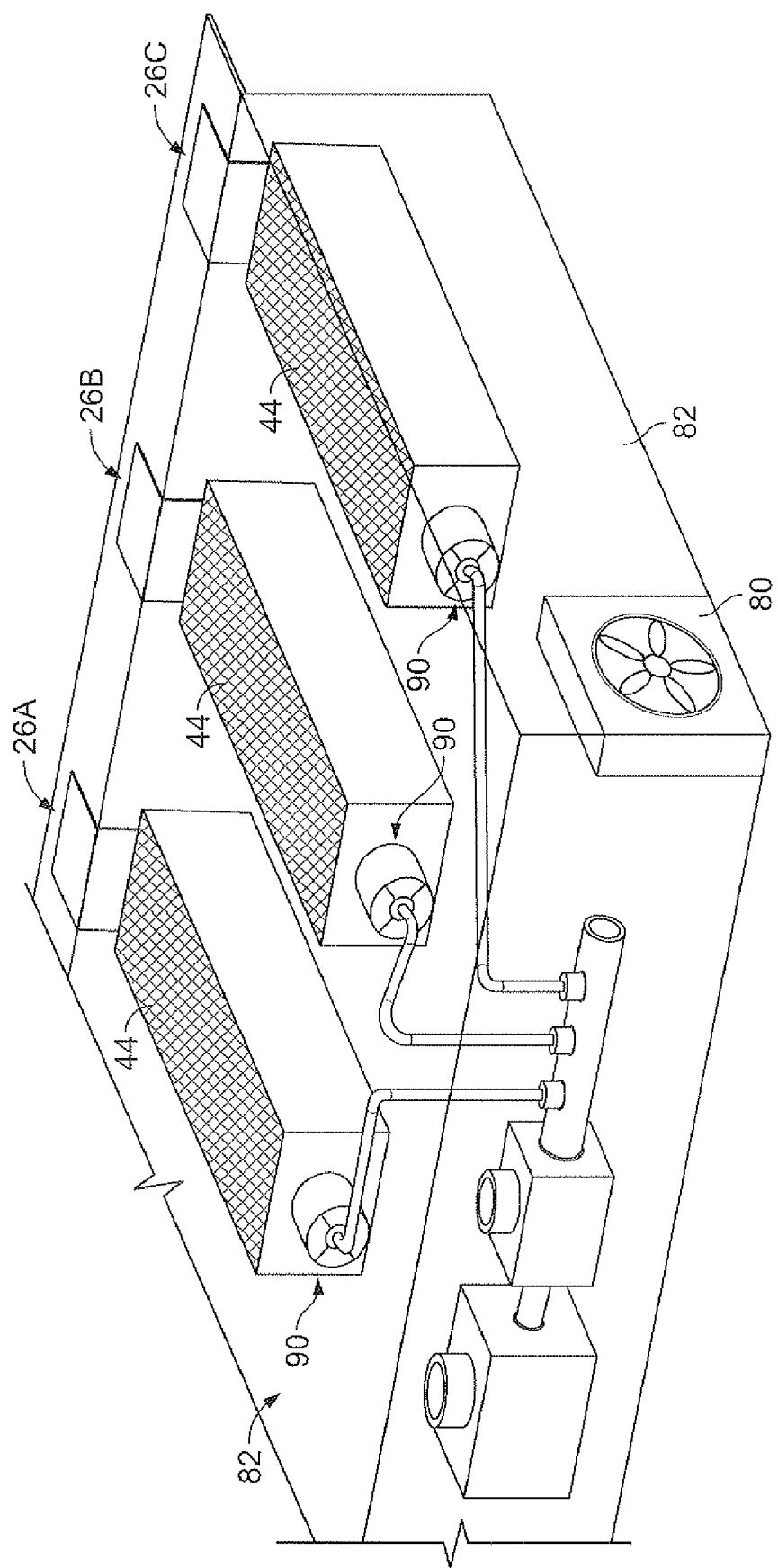
FIG. 8 shows an alternate embodiment of three infrared-emitting burners operated side-by-side.

In a preferred embodiment, the hybrid oven 10 is provided with one or more electrically powered, top-mounted IR heaters 24 and several bottom mounted gas-fired heaters 26 as shown in FIGS. 3, 7 and 8. In an alternate embodiment, however, the top-mounted IR heaters are also gas fired so that the top-mounted heaters 24 and the bottom mounted heaters 26 are both gas-fired.

One or more temperature sensors 41 are positioned through-out the oven 10, in order to measure or "sense" the oven's internal temperature. In a preferred embodiment, and as shown in FIG. 3, several temperature sensors 41 are positioned both above and below the conveyor 22, which each sensor being connected into the CPU 32 so that the temperature each of the "detects" can be read by the CPU under software control. The sensors 41 enable the CPU to make various temperature measurements through-out the oven's interior.

When a relatively cold item is placed onto the conveyor 22 and carried into the oven's interior, the item will of course absorb heat from the oven's interior. When heat is absorbed from the oven's interior, the heat absorption will be detected by the sensors' 41 detecting a reduced or lower temperature. When the oven temperature falls, as detected by the sensors 41 and read by the CPU 32, the CPU can increase or decrease the gas supply duty cycle, i.e., the "on" time relative to its "off" time, in order to maintain an oven temperature. The "on" and "off" time of the electric infrared heaters is also controlled to maintain the oven's temperature. In one embodiment, the sensors 41 are embodied as thermistors.

In one embodiment, the individual ones of the top-mounted electric IR heaters and the bottom-mounted gas-fired IR heaters are controlled by the CPU 32 in unison such that they all go on and off at substantially the same time, gas and electric heaters alike, to effectuate oven temperature control. In an alternate embodiment individual ones of the top-mounted IR heaters and individual ones of the bottom-mounted gas-fired IR heaters are independently actuated and individually modulated. In other words, the first electrically-powered IR heater 24A can be operated at a different output wavelength or power level than heaters 24B and 24C, either or both of which can also be powered off completely. Similarly, the gas-fired IR heaters 26A and 26B can be separately controlled to generate different IR wavelengths from each of them. One or both of the depicted heaters 26A and 26B can also be left off.

By way of example, the electric energy supplied to the heaters 24A, 24B and 24C can be separately controlled so that each heater outputs progressively higher (or lower) output power levels and/or progressively longer wavelength IR, than the heater(s) before it. In such an example, the electric power supplied to the heaters 24A is controlled and power to the gas valve for heater 26A is cycled to cause one or both of the heaters 24A and 26A to emit relatively short wavelength and deep penetrating IR to either defrost or pre-heat a frozen or cold food item put into the oven 10.

After being subjected to relatively short wavelength and relatively deep-penetrating infrared from one or more first heaters 24A and 26A, the second heaters 24B and 26B can be controlled to provide more, short-wavelength IR or perhaps to provide longer IR wavelength to brown the food item. Additional electric and gas-fired heaters (not shown) to the right of heaters 24B and 26B can be similarly controlled by the controller to output either the same or different IR wavelengths at various output power levels or successively higher or lower output power levels to modulate the cooking process as needed. Conveyor speed can also be adjusted according to the output power levels of the heaters 24 and 26.

The infrared heat intensity emitted from the electrically powered burners 24 is controlled through the adjustment of the electrical energy supplied to electric heating elements by the controller 32. Prior art techniques for controlling infrared heaters include varying the duty cycle of an A.C. voltage as well as varying the magnitude of a D.C. or A.C. voltage delivered to a heating element until it is sufficiently heated to emit IR. The power delivered to an electric element can also be controlled by cycling the supplied power on and off using either relays, an SCR or a TRIAC for example.

Infrared heat intensity emitted from the gas-fired burners 26 is controlled by cycling the gas supply 30 on and off using a two-position, electrically operated gas valve 28, i.e., an electrically operable valve that is either "on" or "off." The gas supply 30 is by opening and closing the electrically operated as valve 28 coupled between the gas supply 30 and the burners 26. Since the gas supply to the burners 26 is cycled on and off, the burners 26 are referred to herein as "pulsed" burners.

When the gas supply 30 is on, the gas' combustion heats a wire screen 44 to a temperature at which the screen 44 emits a desired IR. After the screen 44 is heated, the gas is shut off. Because the screen 44 is hot, it immediately begins to emit IR, but it also begins to cool. As the screen wire cools, it continues to emit IR. Because it emits IR as it cools, the wavelength of the emitted IR lengthens as the screen's temperature drops. The "on" time of the gas supply, therefore determines the intensity/wavelength of the IR emitted from screen 44. A corollary of cycling the gas supply 30 on and off is that the IR from the burner 26 will vary but will nevertheless have an average output wavelength that can be lengthened or increased, to produce relatively less intense IR, by decreasing the gas supply 30 "off" time relative to the "on" time. Conversely, the average output wavelength of the IR can be shortened or decreased, thereby increasing the relative IR intensity, by decreasing the gas supply 30 "off" time relative to the "on" time.

Figure 4:
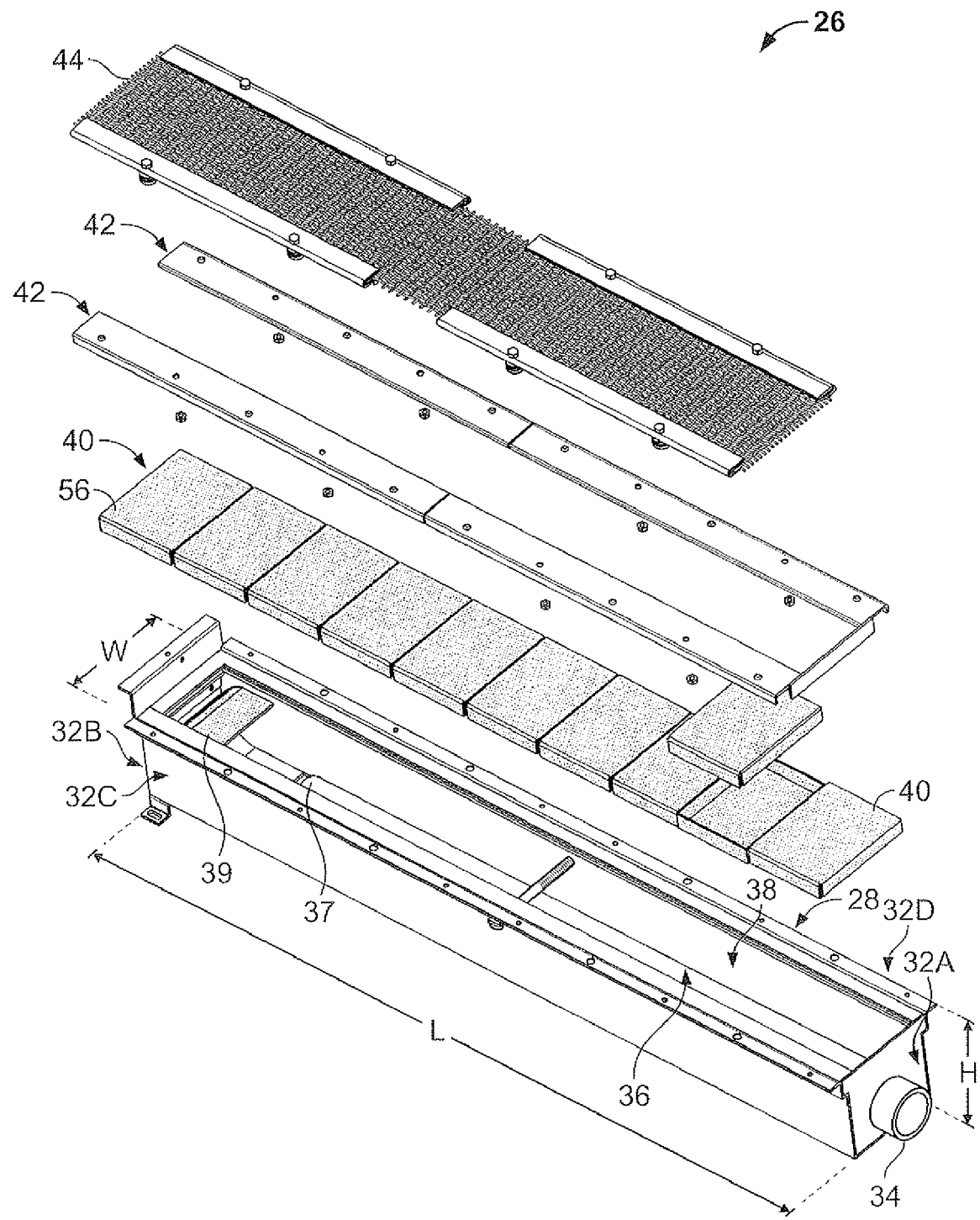
FIG. 4 is an exploded view of a gas burner used in the hybrid oven.

FIG. 4 shows an exploded view of a gas burner 26 used in the oven 10 of FIG. 2 and FIG. 3. The structure shown in FIG. 4 is also described in the applicants' co-pending patent application for an INFRARED EMITTING GAS BURNER, filed on Mar. 28, 2007, the U.S. application Ser. No. 11/692,465. The description of the gas burner in the co-pending application is incorporated herein by reference in its entirety.

As stated in the co-pending application, the gas burner of FIG. 4 is constructed from a fuel distribution chamber, which is identified in this application by reference numeral 28. The fuel distribution chamber 28 is in the shape of a cuboid or rectangular parallelepiped 28 having a bottom (not shown) and four sides 32A, 32B, 32C and 32D and an open top 38, through which a gas/fuel mixture flows from the interior of the chamber 28.

The fuel distribution chamber 28 has a length L, a width W, and a height H, defined by the depth of the fuel distribution chamber 28. A gas and/or gas/combustion air mixture is introduced into the distribution chamber 28 though a fuel inlet pipe 36, one end of which 34, extends through one side 32A of the chamber 28. The fuel inlet pipe 36 extends through most of the length L, of the fuel distribution chamber 28.

At the second or distal end 37 of the fuel distribution pipe 36, the fuel and/or fuel/air mixture leaves the pipe 36 and strikes a U-shaped gas diverter vane 39, which is sized, shaped and arranged to redirect gas leaving the fuel inlet pipe 36, back toward the first side 32A of the distribution chamber 12.

The open top 38 of the fuel distribution chamber 28 is covered by several, separate individual wire mesh burner plates 40, which are described in a co-pending patent application entitled, WIRE MESH BURNER PLATE FOR A GAS OVEN BURNER, filed on Mar. 28, 2007 and having application Ser. No. 11/692,424, the entire disclosure which is incorporated herein by reference.

One or more wire mash burner plates 40 cover the open top 38 of the fuel distribution chamber 28. Fuel and air that leaves the second opening 37 of the pipe 36 fills the distribution chamber 28 and eventually flows upward (relative to the bottom of the fuel distribution chamber 28) through the wire mash burner plates 40 that extend over the open top 38 of the distribution chamber 12.

Fuel and air flowing upwardly through the burner plates 40 is ignited by a pilot flame (not shown), which is lit by electric igniter controlled by the controller 32 in order to cause the fuel and air mixture leaving the top of the burner plates 40 to ignite and thereafter combust. A gasket 42 around the burner plates 40 prevents fuel and combustion air from leaking from the sides of the burner plates 40 thereby insuring that the fuel/air mixture passes through the burner plates 40.

The fuel that passed through the burner plates 40 combusts above the plates 40 but below the wire burner screen 44, which is preferably a low mass, heat tolerant material that quickly reaches an IR-emitting temperature by the combustion of the fuel air mixture. The burner plate screen 44 is preferably made from nichrome wire.

Once the screen 44 reaches a desired infrared emission, the fuel supply 30 is shut off by the controller 32. After the fuel gas is shut off, the hot wire burner screen 44 will emit IR and will continue to emit IR energy as it cools. At a later time, which is determined by controller software, the gas supply 30 is restored, the fuel/air mixture re-ignited to re-heat the wire burner screen 44.

As described in the applicants' co-pending application for a wire mesh burner screen, fuel combustion takes place above the burner plates 32 but below the burner plate screen 44. The space between the screen 44 and the burner plates 40 defines a combustion space. The height or spacing of the wire screen 44 above the burner plates 40 is therefore chosen to provide a space large enough to allow the fuel to fully combust below the burner plate screen 44 to thereby maximize the transfer into the screen 44.

Figure 5:
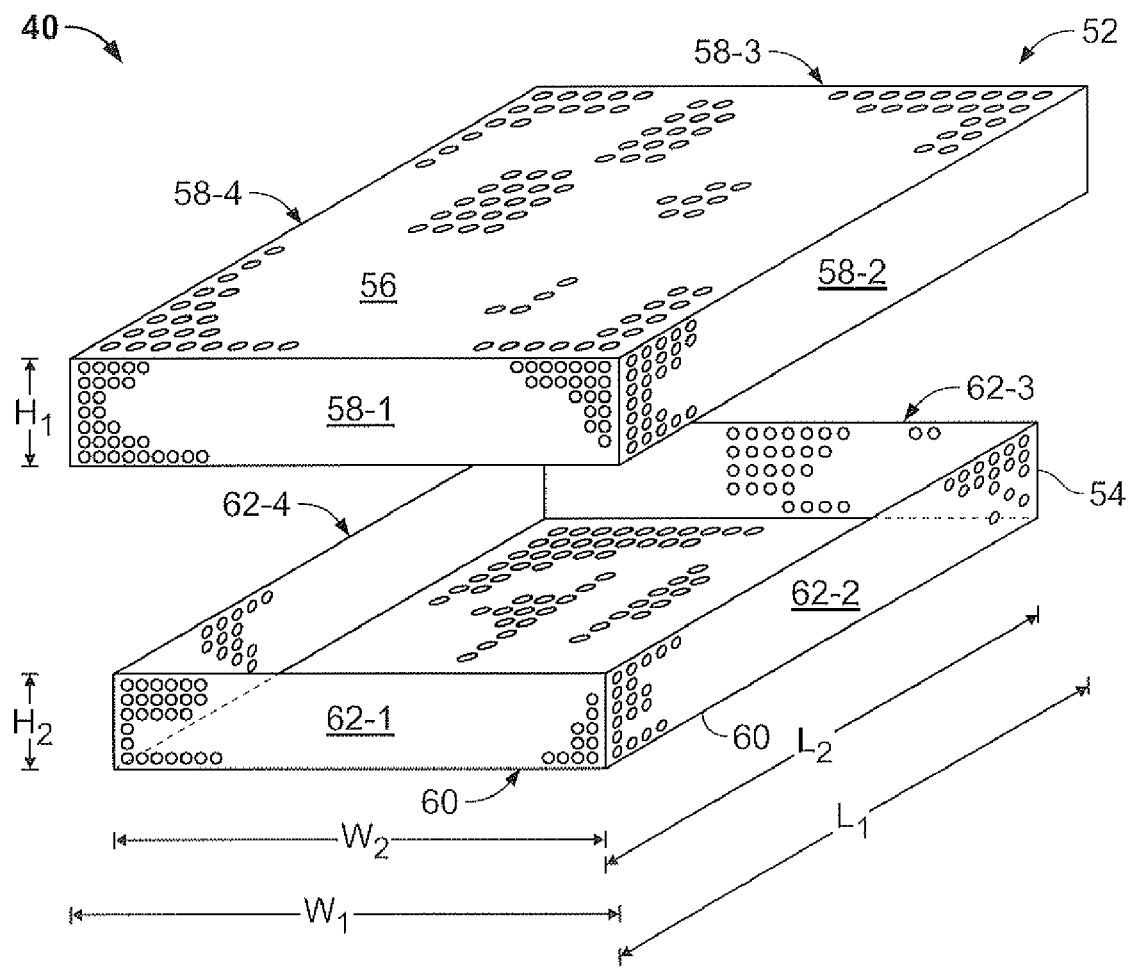
FIG. 5 shows the structure of a wire mesh burner plate used in the gas burners shown in FIG. 4.

The wire mesh burner plates 40 are fully described in the applicants co-pending patent application for a wire mesh burner plate for a gas oven burner, however, FIG. 5 shows a perspective view of one embodiment of a wire mash burner plate 40 constructed from open top parallelepipeds 52 and 54. A top or first open-faced parallelepiped 52 is formed from a piece of wire mesh preferably made 29 gauge perforated stainless steel sheet or other heavy gauge and heat-tolerant mesh or mesh-equivalent.

The first parallelepiped 52 has a first major face 56 of mesh material and four mesh sides 58-1, 58-2, 58-3 and 58-4. The sides 58 are formed by bending, folding, welding or stamping in order to form the sides 58, to be orthogonal, or substantially orthogonal, to the first major face 56.

A bottom or second open-faced parallelepiped 54 also as a first major face 60 and four sides 62-1, 62-2, 62-3 in 62-4. As with the first open-faced parallelepiped 52, the second open faced parallelepiped that 54 as one of its major face is opened or missing.

Both of the parallelepipeds 52 and 54 have length, width and depth dimensions as shown, however the width and the length of the bottom or second open-faced parallelepiped 54 shown in FIG. 5 is sufficiently smaller or less than the width and length of the top or first open-faced parallelepiped 52 in order to allow the second or bottom parallelepiped 54 to fit snugly within or "nest" within the first parallelepiped 52 as described in co-pending application Ser. No. 11/692,424.

Figure 6:
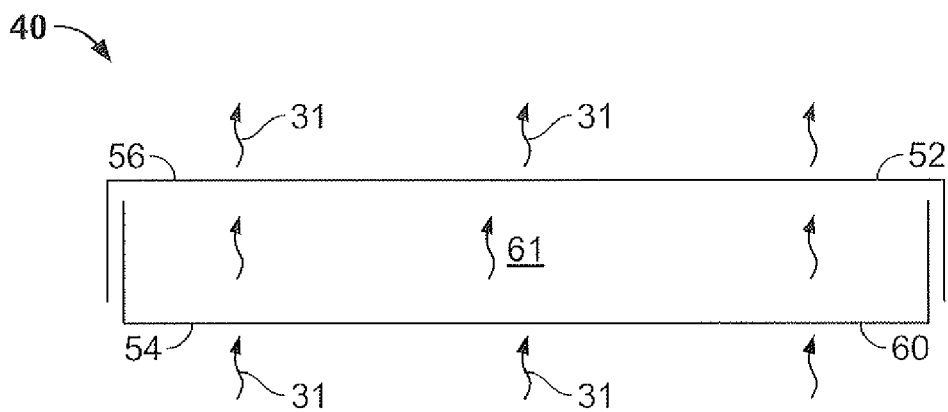
FIG. 6 is cross-sectional view of the wire mesh burner plate shown in FIG. 5.

FIG. 6 is a cross-section of the nested open-faced parallelepipeds 52 and 54 shown in FIG. 5 but with the size differences exaggerated to show how one parallelepiped 54 fits within the other parallelepiped 52. Note that each of the parallelepipeds 52 and 54 have an open or missing major face. The bottom or second open-top parallelepiped 54 is located almost entirely within the volume enclosed by the faces and sides of the first open-top parallelepiped 52. Nesting one open-top parallelepiped in the other open-top parallelepiped defines an open volume 60, approximately ½" in the preferred embodiment, wherein fuel and combustion air mixes as it flows from the bottom major face 58 through the top major face 56 above which the fuel/air mixture combusts. The fuel and air mix within the open volumes 61 because of turbulence created by a pressure drop experienced after the gases flow through the holes in one of the major faces 56 or 58.

As described in the co-pending application entitled WIRE MESH BURNER PLATE FOR A GAS OVEN BURNER, several burner plates 40 can be hooked together by inverting every other burner plate 40 such that one side of a first downwardly-oriented large parallelepiped hangs over one side of a second, adjacent, upwardly-oriented parallelepiped. By orienting the large parallelepipeds so that every other parallelepiped has its large half facing downward, the sides of the larger open-top parallelepipeds can be engaged to each other to form an extended wire mesh burner plate. Several burner plates can be hooked together in a checker board pattern, as described in the co-pending application for a wire mesh burner plate, with every other wire mesh burner plate being inverted relative to its adjacent neighbors to form a very wide as well as a very long wire mesh burner plate.

Referring to FIG. 4, as the fuel/air mixture passes through the burner plates 40, the fuel/air mixture is ignited and combusts in a space between the burner plate 40 and a wire mash burner screen 44. Fuel combustion heats the wire screen 44 until it emits infrared energy. As set forth more fully below, the intensity of IR emitted from the wire screen 44 is a function of its wavelength, which is a function of the screen's temperature. After the gas is shut off, IR energy continues to be emitted from the screen 44 as it cools, with the emitted-IR wavelength gradually but continuously increasing as the screen 44 temperature drops. Infrared heat intensity is therefore controllable by cycling the gas supply 30, on and off, i.e., by opening and closing the electrically operated fuel valve 28 under software control of the controller 32.

FIG. 7 shows three gas-fired burners 26A, 26B and 26C arranged side-by-side, for use in the hybrid oven 10 depicted in FIG. 2. Combustion air is forced into each of the burners 26 from a blower 27, the output of which is routed to the burners 26 through a combustion air manifold 29. Each burner inlet 34 also receives fuel gas from a fuel gas manifold 3. When the fuel/air mixture is ignited, the burners emit infrared heat 33 from the heated burner screens 44.

Figure 9:
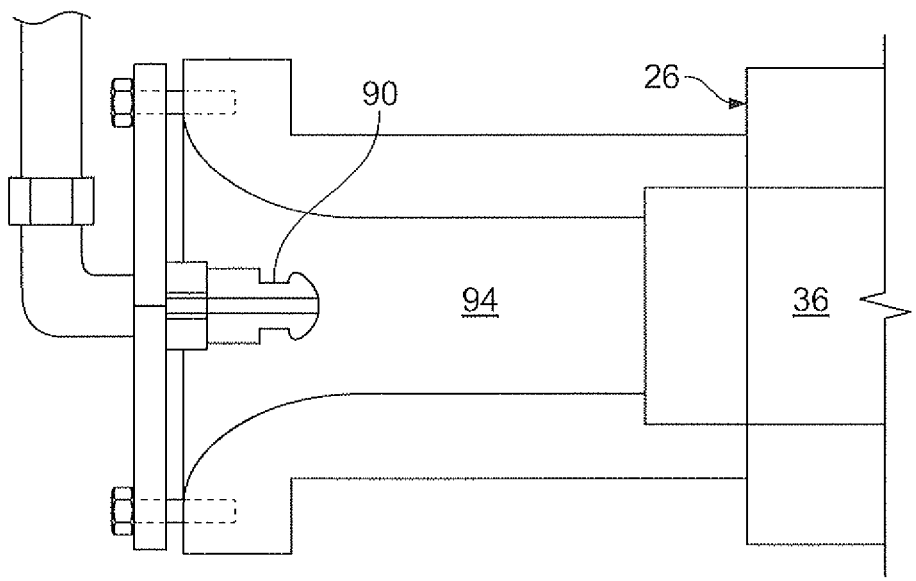
FIG. 9 shows a cross-section of the burner nozzle used in the burners depicted in FIG. 8.

FIG. 8 depicts an alternate embodiment of three, gas-fired burners 26A, 26B and 26C, arranged side-by-side for use in the hybrid oven 10 depicted in FIG. 2. In FIG. 8, however, combustion air is indirectly forced into each of the burners 26 from a blower 80, which forces combustion air into an interior cavity 82 that is sealed to form an air plenum. Since the plenum is at a slightly elevated pressure, air is forced or urged into a nozzle 90 placed into each of the infrared-emitting burners described above and in co-pending application Ser. No. 11/692,465. As shown in FIG. 9, fuel gas supplied to each nozzle 90 flows into a venturi 94. The fuel gas and combustion air flows through from the venturi 94 into the fuel inlet pipe of the burners 26.

Figure 10:
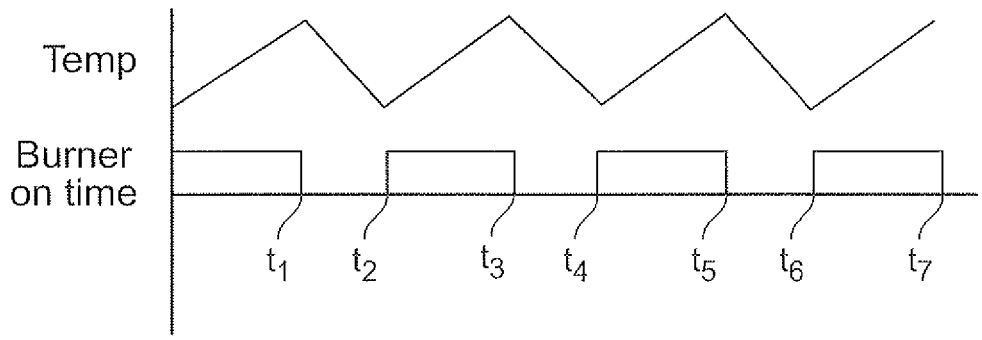
FIG. 10 is a graph depicting an example of the gas supply "on" time for a burner shown in FIG. 3 and showing the corresponding output temperature of the gas burner shown in FIG. 3.

FIG. 10 depicts a graph of an example of the fuel valve "on time" on the horizontal axis. The screen temperature is plotted on the vertical axis. Between the start time and t1, the controller 32 turns on the gas valve 28 and ignites the fuel/air mixture. The temperature of the wire screen 44 rises as long as the gas supply is on. At time t1 the gas valve 28 is shut off.

Between time t1 and t2, the wire screen 44 emits IR as its temperature decreases. As its temperature decreases, the emitted IR wavelength increases. At time t2, the gas valve 28 is reopened and combustion reestablished, which causes the temperature of the screen 44 to increase. At time t3, the gas valve is closed, the wire screen 44 continues to emit IR as it cools until the gas and combustion is restored at time t4. As the screen 44 temperature increases and decreases, the emitted IR wavelength decreases and increases respectively.

Figure 11:
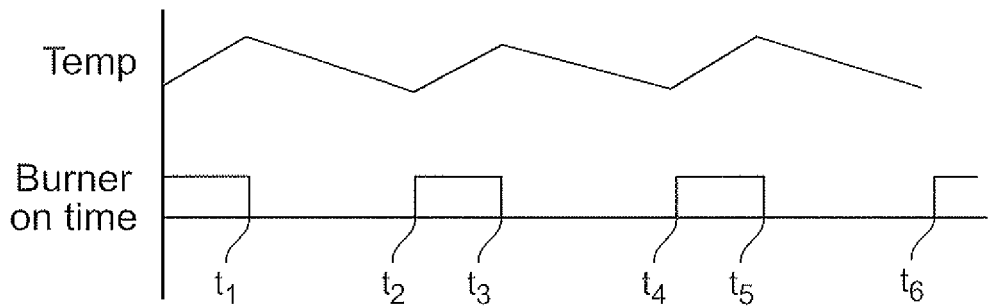
FIG. 11 is a second graph of the "on" time for the burner of FIG. 3 and the corresponding output temperature of the gas burner shown in FIG. 3.

In FIG. 11, the burner 26 on time and the screen 44 temperature are also plotted together as in FIG. 10, however, in FIG. 11, the duty cycle or "on time" of the burner 26 is less than the burner on time depicted in FIG. 10. As a result, the screen 44 temperature does not go as high as it does in FIG. 10 nor does it emit as much short-wavelength IR.

In the hybrid oven 10, heating the wire screen 44 to a temperature of 2000 degrees or higher and shutting off the gas will allow the screen wire 44 to initially emit the more deeply penetrating short wavelength IR. As the screen 44 cools, however, it will continue to emit IR. As the screen 44 cools, the emitted IR wavelength will continuously lengthen, becoming increasingly less intense albeit more surface-browning IR. Cycling the screen wire 44 temperature will therefore have the effect of sweeping the food item with a broad spectrum of IR energy. The plots shown in FIGS. 7 and 8 can therefore be considered to depict the relative intensity and frequency of IR emitted from the screen 44 and the burners 26 as a function of time, where the emitted frequency=1/λ and λ=emitted wavelength.

Those of ordinary skill in the art will recognize that the heat emitted from the screen wire 44 will have an average value between the maximum and minimum temperatures. They will also recognize that the average output wavelength can be increased or raised by changing the "on" time relative to the "off" time. Thus, the average infrared output energy level of the burner screen 44 shown in FIG. 11 is less than that shown in FIG. 10. By controlling the on time and off time of the gas valve 28, the average infrared energy emitted from the burners 26 can be controlled.

In an alternate embodiment, pre-mixed fuel and air is supplied to the burner but instead of turning the gas supply on and off, the flow rate of the fuel/air mixture into the burner is controlled or modulated in order to control the heat energy produced by combustion and hence input to the burner screen 44. In such an embodiment, the fuel and air can be mixed stoichiometrically and the flow rate of the mixture controlled. In another embodiment, the flow rate of just the fuel gas is controlled. In either embodiment, the heat produced by combustion is continuously modulated by one or more continuously adjustable valves, not shown.

Gas burner testing shows that the burner screen 40 lifespan is extended by cycling the gas supply on and off instead of continuously heating the screen 40. Since the temperature difference between the screen 44 and the combustion flame is greater when the wire screen has cooled, heat transfer from the combustion products is improved by cycling the gas, which results in a more energy efficient heater.

In a preferred embodiment of the oven 10, the burners located at the top of the oven are electric quartz heaters. In an alternate embodiment, one or more burners located at the top of the oven are also gas fired. The lower or bottom burner in such an alternative embodiment is either gas-fired burner or an electric infrared heater.

In a preferred embodiment the controller 32 cycles the gas supply on and off for and on time that varies between about five seconds and about 60 seconds. The rapid cycling and relatively short on time allows the average infrared output level to be steadied, in other words held relatively constant while providing the advantages of improved efficiency and enhanced lifespan for the wire mash burner plates.

The foregoing description is not intended to and should not be construed to define or limit the invention's scope. The true scope of the invention is defined by the appurtenant claims.

What is claimed is:

1. An oven comprising:
    a cavity having a top, a bottom, a first opening and a second opening;
    a first, electrically-powered burner which provides infrared energy;
    a second, gas-fired burner, which provides infrared energy across a spectrum of different infrared wavelengths the gas-fired burner comprised of:
        a burner plate screen below which a gas/fuel mixture at least partially combusts and which heats the burner plate screen, said burner plate screen configured to emit infrared energy, emitted infrared energy having a wavelength corresponding to the burner plate screen temperature;
    a conveyor that extends between the first opening and the second opening and which is between the first burner and the second burner;
    a gas valve, coupled between a gas source and the gas-fired burner; and
    a controller, operatively coupled to the gas valve, the controller being configured to control gas flow through the gas valve in order to cycle the burner plate screen temperature within a range of temperatures, the burner plate screen emitting correspondingly different maximum infrared energy intensities within the range of temperatures, the controllably cycled temperature of the burner plate thereby sweeping a food item with a continuously varying spectrum of infrared energy having maximum infrared energy intensities at wavelengths that are between about 1.0 and about 4.5 micrometers.

2. The oven of claim 1, wherein the wavelengths are between about 2.5 and about 3.5 micrometers.

3. An oven comprising:
a cavity having a top, a bottom, a first opening and a second opening;
a conveyor that extends between the first opening and the second opening;
at least one gas-fired burner within the cavity and which directs infrared heat toward the conveyor, the at least one gas fired burner comprised of:
at least one wire mesh burner plate comprised of first and second, substantially parallel, spaced-apart wire mesh burner plates, above which a gas/fuel mixture combusts;
a burner plate screen spaced above and extending over the at least one wire mesh burner plate and below which the gas/fuel mixture at least partially combusts, the combustion of the gas/fuel mixture heating the burner plate screen to at least one temperature at which the burner plate screen emits infrared energy, said burner plate screen emitting infrared energy at wavelengths corresponding to the burner plate screen temperature;
an electrically-operated gas valve, coupled between a gas source and the at least one gas-fired burner;
a controller, operatively coupled to the electrically-operated gas valve and coupled to an igniter, the controller controllably sweeping the range of infrared wavelengths emitted from the burner plate screen by cycling the gas supply on and off and igniting the gas in order to controllably cycle the temperature of the burner plate screen between first and second temperatures, at which the burner plate screen emits infrared energy at correspondingly different wavelengths, the first temperature being such that the wavelength of the maximum emitted infrared is about 4.5 micrometers, the second temperature being such that the wavelength of the maximum emitted infrared is about 1.0 micrometer.

4. The oven of claim 3, wherein the second temperature is such that the emitted wavelength is less than about one micrometer.

5. The oven of claim 4, wherein the at least one gas-fired burner is at the bottom of the oven, below the conveyor and projects continuously and controllably varying wavelengths of infrared upwardly and toward the first electrically powered infrared heater.

6. The oven of claim 4, wherein the at least one gas-fired burner is at the top of the oven, above the conveyor and projects continuously and controllably varying wavelengths of infrared heat downwardly.

7. An oven comprising:
a cavity having a top, a bottom, a first opening and a second opening;
a conveyor that extends between the first opening and the second opening;
a first electrically powered infrared heater, which directs infrared heat toward the conveyor;

a pulsed, gas-fired burner within the cavity and which directs infrared heat of controllably varying wavelengths toward the conveyor, the pulsed gas fired burner comprised of:
at least one wire mesh burner plate comprised of first and second, substantially parallel, spaced-apart wire mesh burner plates, above which a gas/fuel mixture combusts;
a burner plate screen spaced above and extending over the at least one wire mesh burner plate and below which the gas/fuel mixture at least partially combusts, said burner plate screen emitting infrared energy after being heated by the gas/fuel mixture combustion; and
an electrically-operated gas valve, coupled between a gas source and the gas-fired burner;
a user input control panel;
a controller, operatively coupled to the user input control panel and to the gas valve, the controller controlling the wavelengths of infrared heat emitted from the pulsed, gas-fired burner by periodically and repeatedly cycling the gas supply on and off, responsive to an input from the controller in response to an input received by the controller from the user input control panel;
wherein the gas supply is turned on for a first time period during which the gas combusts in order to raise the temperature of the burner plate screen to a first temperature at which the burner plate screen emits a first peak wavelength of infrared energy; and
wherein, after the expiration of the first time period, the gas supply is turned off for a second time period during which the burner plate screen cools from the first temperature to a second temperature, emitting increasingly longer peak wavelengths of infrared as the burner plate screen cools from the first temperature to the second temperature;
wherein after the expiration of the second time period, the gas supply is turned on again for the first time period in order to raise the burner plate screen temperature to said first temperature again;
wherein the gas supply is repeatedly turned on and off for the first and second periods to thereby controllably sweep a food item with continuously varying peak wavelengths of infrared energy, the peak wavelengths of emitted infrared varying between about 1.0 micrometer and about 4.5 micrometers.

8. The oven of claim 7 wherein the controller cycles the gas supply for an on time of between about five seconds and about sixty seconds.

9. The oven of claim 7 wherein the at least one gas-fired burner is at the top of the oven, above the conveyor and projects infrared heat downwardly.

10. An oven comprising:
a cavity having a top, a bottom, a first opening and a second opening;
a conveyor that extends between the first opening and the second opening;
at least one gas-fired burner within the cavity and which directs infrared heat toward the conveyor, the at least one gas fired burner comprised of:
at least one wire mesh burner plate;
a burner plate screen spaced above and extending over the at least one wire mesh burner plate and below which the gas/fuel mixture at least partially combusts;
wherein fuel gas to the burner is controllably cycled on and off in order to cause the temperature of the burner plate screen to fluctuate between first and second temperatures, said burner plate screen thereby emitting IR, the wavelengths peak of which vary continuously with said first and second temperatures between about 1 micrometer and about 4.5 micrometers.

11. An oven comprising:
a cavity having a top, a bottom, a first opening and a second opening;
a first, electrically-powered burner which provides infrared heat;
a second, gas-fired burner, which provides infrared energy across a spectrum of different infrared wavelengths the gas-fired burner comprised of:
  a burner plate screen below which a gas/fuel mixture at least partially combusts and which heats the burner plate screen, said burner plate screen configured to emit infrared energy, emitted infrared energy having a wavelength corresponding to the burner plate screen temperature;
a conveyor that extends between the first opening and the second opening and which is between the first burner and the second burner;
a gas valve, coupled between a gas source and the gas-fired burner; and
a controller, operatively coupled to the gas valve, the controller being configured to control gas flow through the gas valve in order to cycle the burner plate screen temperature, between first and second temperatures, the burner plate screen emitting correspondingly different wavelengths of infrared energy at the first and second temperatures and at temperatures there between, the controllably cycled temperature of the burner plate thereby sweeping a food item with a continuously varying spectrum of infrared energy, the infrared energy emitted at the first temperature being of a long peak wavelength and penetrating foods to a shallow depth, the infrared energy emitted at the second temperature being of a short peak wavelength and penetrating foods more deeply than the long peak wavelength infrared, wherein the long peak wavelength is about 4.5 micrometers and wherein the short peak wavelength is about 1.0 micrometer.

12. An oven, comprising:
a gas-fired burner that is operative to provide infrared energy across a spectrum of different infrared wavelengths, the gas-fired burner comprised of:
  a burner plate screen below which a gas/fuel mixture at least partially combusts and which heats the burner plate screen, said burner plate screen configured to emit infrared energy corresponding to the burner plate screen temperature; and
a controller that is operative to vary the burner plate screen temperature within a temperature range having a maximum infrared energy at a wavelength between 1.0 and 4.5 micrometers.

13. The oven of claim 12, wherein the maximum infrared energy is at a wavelength between about 2.5 and about 3.5 micrometers.

* * * * *